Figure 4:
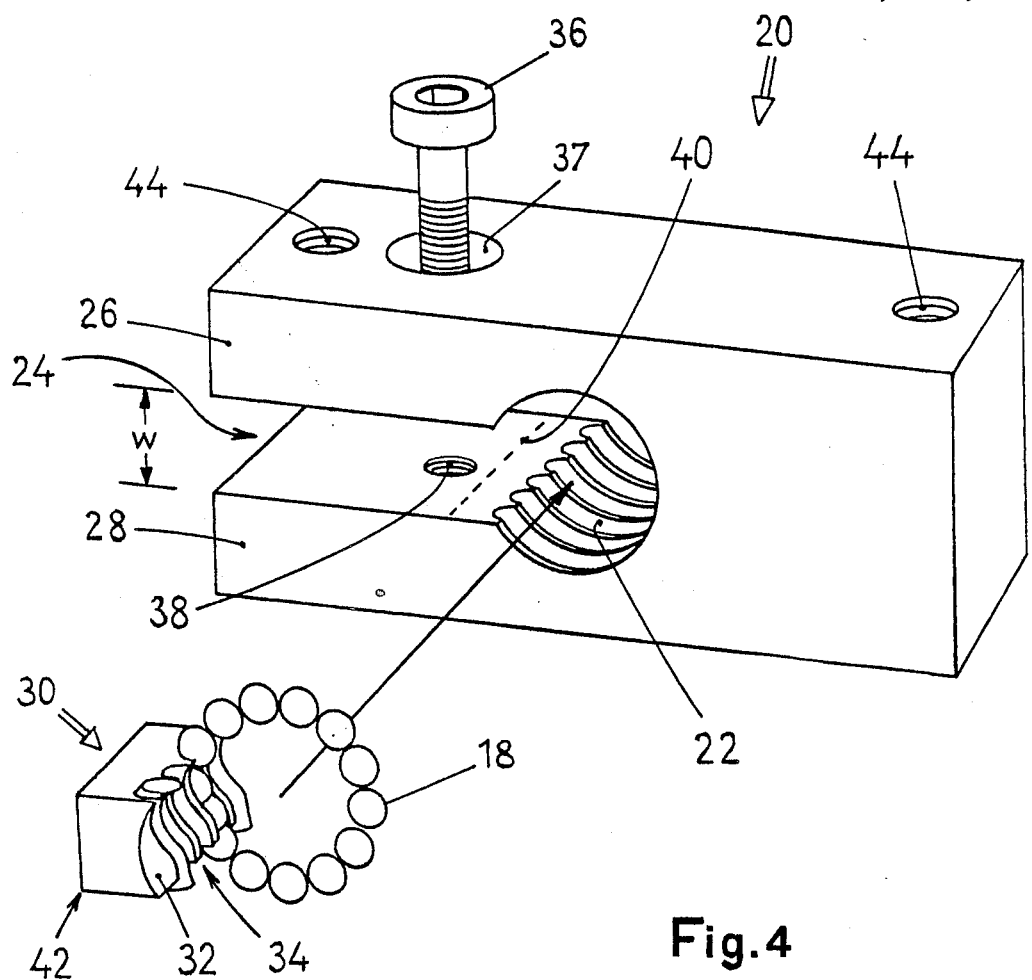

United States Patent [19]

Isert

[11] Patent Number: 4,945,781
[45] Date of Patent: Aug. 7, 1990

[54] BALL SCREW MECHANISM

[76] Inventor: Hugo Isert, Im Leibolzgraben 16, D-6419 Eiterfeld 1, Fed. Rep. of Germany

[21] Appl. No.: 377,099

[22] Filed: Jul. 10, 1989

[30] Foreign Application Priority Data

Jul. 19, 1988 [DE] Fed. Rep. of Germany ... 8809239[U]

[51] Int. Cl.$^5$ ...................... F16H 25/22; F16H 25/24
[52] U.S. Cl. .................... 74/424.8 A; 74/459
[58] Field of Search ............................ 74/424.8 A, 459

[56] References Cited

U.S. PATENT DOCUMENTS

| | | | |
|---|---|---|---|
| 2,833,156 | 5/1958 | Spontelli | 74/459 |
| 3,327,551 | 6/1967 | Prueter | 74/459 X |
| 3,580,098 | 5/1971 | Goad | 74/459 |
| 3,731,553 | 5/1973 | Nilsson | 74/459 |
| 3,842,690 | 10/1974 | Gulick | 74/424.8 A X |
| 4,023,431 | 5/1977 | Pavlas | 74/424.8 A |
| 4,176,561 | 12/1979 | Davidson | 74/424.8 A |

FOREIGN PATENT DOCUMENTS

| | | | |
|---|---|---|---|
| 1265424 | 10/1986 | U.S.S.R. | 74/459 |
| 17325 | 11/1900 | United Kingdom | 74/424.8 A |

Primary Examiner—Allan D. Herrmann
Attorney, Agent, or Firm—Fred Philpitt

[57] ABSTRACT

The invention relates to a ball screw mechanism (10) having a nut (20) screwing along a worm spindle (12) with at least one set of balls (18) lodged therebetween. The nut is preferably an elongate cuboid block and has gripping jaws (26, 28) for retaining a recirculator (30) that includes an inner face (32) having S-shaped curved transition grooves (34) for returning balls that circulate within the nut, by one flight each of the worm tap. Unilaterally along the axial worm-tap hole (22) in the nut (20), there is a radial recess (24) matching the shape of the recirculator (30) which is a shoe fitting into a slot adjacent the worm-tap hole (22). A straining bolt (36) may be provided on the nut (20) for adjusting the clear width (w) of its jaws (26, 28) which may be prestressed. Fixing means may be provided on the nut (20) for mounting subassemblies, engaging means, etc.

9 Claims, 2 Drawing Sheets

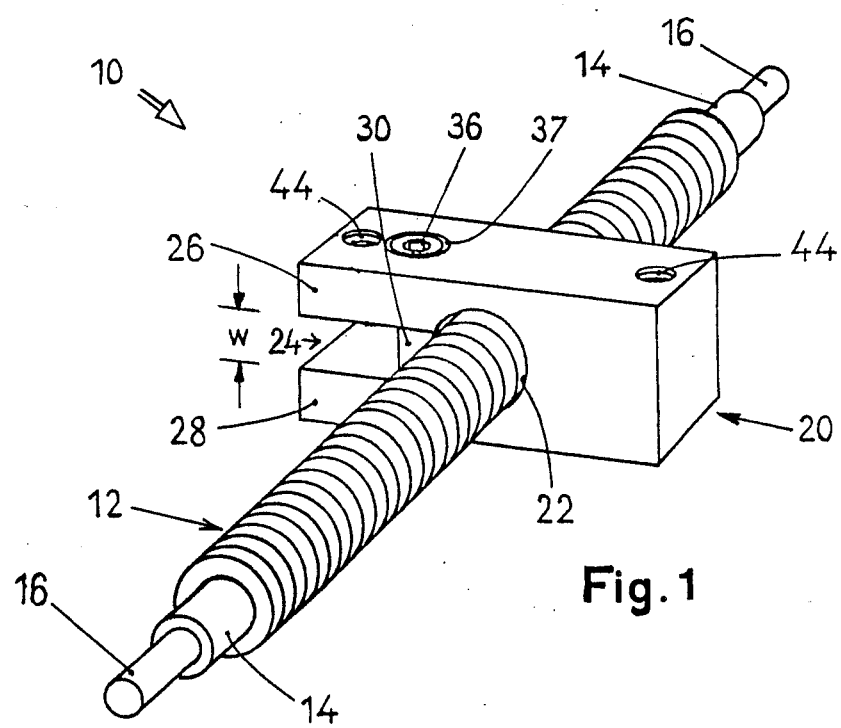
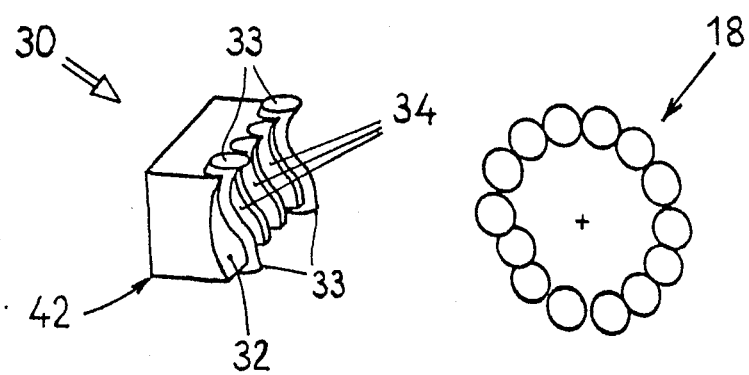

BALL SCREW MECHANISM

FIELD OF THE INVENTION

The invention relates to a ball screw mechanism having a worm spindle with a nut screwing along it by means of at least one set of balls lodged therebetween.

BACKGROUND OF THE INVENTION

Such ball screw mechanisms have been known for many years. They comprise a recirculating unit for returning, by one or more threads each, balls that circulate in grooves between a worm spindle and a nut. External recirculator tubes are customary with coarse thread or multithread arrangements. A recirculator without a solid base as described in DE-U-8 108 413 comprises a cage-like guide frame composed of webs and bridges. A design disclosed in DE-C-2 355 844 features a recirculator extending through the nut, with radial projections matching the worm grooves.

There are problems as to fitting accuracy and constancy of registration with such ball screw mechanisms. They should be free of steps and gaps in order to prevent hindrances to the ball circulation. However, that can hardly be achieved owing to inevitable tolerances of production and assembly; moreover, the recirculators must be adapted to be exchanged by a replacement unit after wear and tear. Also, exact fit in respect of the angular position relative to the worm is not automatically warranted so that expensive measures to correct the adjustment may become necessary.

OBJECTS OF THE INVENTION

It is an important object of the invention to overcome the disadvantages of the prior art and to create an improved ball screw mechanism of particularly simple structure.

Another object is the development of a recirculator that can be mounted quickly as well as accurately and be adjusted easily for smooth run.

According to a further objective of the invention, a reliable support of the recirculator is to be attained with a minimum of engineering effort.

By yet another object, the invention aims at such a design of the nut that it may serve as a component part of additional functions.

SUMMARY OF THE INVENTION

The invention provides a nut that is designed as a clamp having gripping jaws for retaining the recirculator. The latter can be exactly positioned and secured in a surprisingly simple manner. The spindle nut forms a clasping or chucking device which clamps the recirculator between its jaws so that it is accurately held but is easily replaceable, too. Any desired play for the balls of the screw mechanism can be readily obtained and be adjusted for permanent operation. All of this will greatly facilitate both assembly and maintenance.

SPECIALIZATIONS OF THE INVENTION

The novel design leads to a number of further advantages. Thus the nut is shaped as a generally elongate body extending transversely to the axial direction of the worm-tap hole that is joined unilaterally by a radial recess. The body may be an integral cuboid block well suited for economic manufacture. Conventionally, by contrast, the nut formed a separate component held in a special retaining device, which arrangement required additional fixing means. The radial recess of the present nut may, in particular, be a parallel slot into which a block-shaped recirculator may be fitted from inside in a very convenient way. A recirculator as per the invention will also do for screw mechanisms having several ball series.

An important feature of the invention includes a straining bolt for adjusting the clear width of the clamping jaws, the design and location being such that the recirculator may be clasped with any desirable force in a defined position quickly attained. It will be realized that the straining bolt permits of most sensitive adjustment. Without having recourse to further means, it is possible to achieve smooth run with a minimum of positive allowance.

The jaws of the nut may be prestressed for retaining the recirculator with additional safety under increased load. Moreover, the nut may include fixing means for mounting subassemblies, engaging means, etc. Threaded holes near the nut body ends may suffice to make the nut a support for component parts to be linearly shifted by means of the screw mechanism, such as plates, carriages and the like.

Generally the invention permits of reproducible adjustment parallel to the axis of the worm-tap hole. For special applications, a set screw, a checking element or the like may be provided for achieving best permanent registration, with the possibility of resetting at any time.

DESCRIPTION

Further features, details and advantages of the invention will become apparent from the wording of the claims and from the following disclosure of an embodiment shown in the drawings wherein:

FIG. 1 is a perspective view of a ball screw mechanism according to the invention, FIG. 2 is a perspective view of a recirculator, FIG. 3 is a perspective view of a set of balls and FIG. 4 is an explosive view of the above-mentioned component parts for mounting to provide the mechanism as shown in FIG. 1.

A ball screw mechanism as shown in an assembled arrangement in FIG. 1 is generally designated by 10 and includes a worm spindle 12 having cylindrical portions 14 as well as trunnions 16 at its ends that serve for bearing support.

A set of balls 18 is shown in FIG. 3. It is lodged between the worm 12 and a nut 20 (FIG. 1) designed as a block-shaped clamp. A worm-tap hole 22 extends axially through the nut and is unilaterally continued by a radial recess 24 that is provided between two jaws 26, 28. The contour or overall sectional shape of the worm-tap hole 22 is completed by a recirculator 30 that is clamped between the jaws 26, 28.

The recirculator 30 alone is shown in FIG. 2. It is generally a small angular block having a concave inner face 32 which—in a sectional or side view, see FIG. 4—continues the contour of the worm-tap hole 22. Projections 33 that jut out upwardly and downwardly extend, after mounting, into the adjacent grooves of the tap hole 22 and serve to exactly support the recirculator 30 there. The inner face 32 comprises S-shaped curved transition grooves 34 through which the balls 18 will be returned by one flight each. The mode of assembly is best seen in FIG. 4. The recirculator 30 is placed into the worm-tap hole 22 whereupon the worm spindle 12 is screwed in, with the set of balls 18 being lodged therebetween. If the jaws 26, 28 should have been prestressed, they would be forced apart —e.g. by means of a straining bolt (not shown here) inserted into a threaded hole 44 - until the clear width w of the radial recess 24 will suffice for introducing the recirculator 30. However, if the nut 20 were designed such that the height of the recirculator 30 almost reaches the clear width w, the unit can be put into place without the forcing-apart operation.

Fixing is effected by means of a straining bolt 36 that may have a pan head with a hexagonal socket. The bolt 36 will be slid into a through hole 37 countersunk at its top in the upper jaw 26, and it will be screwed into a tapped hole 38 in the lower jaw 28 for securing the recirculator 30 in the clamping region of nut 20. An outer edge 42 that is parallel to the worm-tap hole axis extends along an edge line 40 that may be imaginary or be provided at the inner face of at least one jaw (say, 28). An adjustment relative to the axis of the worm-tap hole 22 may, in addition, be carried out using a set screw, an adjusting block or the like (not shown).

Important advantages of the invention are due to the fact that the nut 20 may most economically be manufactured as a rectangular or cuboid clamping block. Further, threaded holes 44 may be useful for attaching support plates, carriages, etc. (not shown) especially near the ends of the nut body. The recirculator 30 is quickly and exactly retained. A single straining bolt 36 will do for sensitive adjustment with a minimum of clearance as well as for locking in place and for load back-up. If need be, the straining bolt 36 may additionally be locked, e.g. by adhesive means such as lacquer, paste or loctite cement.

While preferred embodiments have been illustrated and explained hereinabove, it should be understood that numerous variations and modifications will be apparent to one skilled in the art without departing from the principles of the invention which, therefore, is not to be contrued as being limited to the specific forms described.

I claim:

1. A ball screw mechanism comprising in combination
    (a) nut (20) that includes
        (1) a worm tap hole (22) having a plurality of concave circumferential grooves,
        (2) spaced apart jaws (26, 28) located laterally with respect to said worm tap hole (22),
        (3) a recess (24) located between said jaws (26, 28),
    (b) a worm spindle (12) of a selected thread pitch that has a plurality of circumferential concave helical grooves that extend through said worm tap hole (22) so that the worm tap hole (22) extends more than half way around the circumference of the worm spindle (12),
    (c) a recirculator (30) positioned in said recess (24) and encompassing the remainder of the circumference of the worm spindle (12), said recirculator (30) being clamped in place by said jaws (26, 28),
    (d) a plurality of balls (18) which are free to move within a channel formed by the grooves in said worm tap hole (22) and the grooves in said worm spindle (12), and
    (e) the inner concave face (32) of said recirculatory (30) having
        (1) transition means in the form of a plurality of S-shaped grooves (34) arranged side-by-side at thread pitch distance for returning balls that circulate within said nut (20) by one worm tap flight each, and
        (2) projections (33) which engage adjacent nut grooves.

2. The mechanism according to claim 1 wherein said plurality of S-shaped grooves (34) in the inner concave face (32) of the recirculator (30) continues the profile of the worm-tap hole (22) as seen in a side or sectional view such that there is alignment between the ends of each transition grooves (34) and the adjacent worm threads.

3. The mechanism according to claim 1 wherein the nut (20) is made up of a generally elongated body extending transversely to the axial direction of said spindle (2) wherein the recess (24) is a square slot extending parallel to said axial direction between the gripping jaws (26, 28) adjacent to the worm-tap hole (22) and wherein the recirculator (30) is a square shoe fitting into said slot.

4. A mechanism according to claim 3 wherein said nut (20) is in the shape of a cuboid block.

5. The mechanism according to claim 3 wherein the nut (20) includes parallel jaws (26,, 28) spaced by a clear width (w) and wherein a straining bolt (36) is provided on the nut (20) for adjusting the clear width (w) of its jaws (26, 28).

6. The mechanism according to claim 5 wherein the straining bolt (36) is at a location radially beyond the outer edges (42) of the recirculator (30), especially beyond an edge line (40) that is parallel to the axis of the worm-tap hole (22) and extends along at least one of the jaws (e.g. 28).

7. The mechanism according to claim 7 wherein as a setting means for positioning the recirculator (30), the edge line (40) is embodied by way of a checking edge (40) on or in said one jaw (28).

8. The mechanism according to claim 1 wherein the jaws (26, 28) of the nut (20) are prestressed and are adapted to be forced apart, e.g. by means of a pressing screw.

9. The mechanism according to claim 1 wherein the nut (20) comprises fixing means for mounting subassemblies, engaging means, or the like onto the nut (20), which is provided with threaded holes (44), especially near the ends of the nut body.

* * * * *